(12) United States Patent
Heinonen et al.

(10) Patent No.: US 7,529,561 B2
(45) Date of Patent: May 5, 2009

(54) CONTAINER UNIT, MESH NETWORK, AND SYSTEM REPORTING CONTAINER EVENTS

(76) Inventors: Tero Heinonen, Kurkihirrentie 8 O 40, Espoo (FI) FIN02330; Pauli Noronen, Everstinkuja 1 C 80, Espoo (FI) FIN02600

( * ) Notice: Subject to any disclaimer, the term of this patent is extended or adjusted under 35 U.S.C. 154(b) by 426 days.

(21) Appl. No.: 11/468,972

(22) Filed: Aug. 31, 2006

(65) Prior Publication Data
US 2008/0056191 A1    Mar. 6, 2008

(30) Foreign Application Priority Data
Aug. 31, 2006   (EP)   ................................ 06397019

(51) Int. Cl.
*H04M 1/00* (2006.01)
(52) U.S. Cl. ................ 455/552.1; 455/41.2; 455/554.2; 455/553.1
(58) Field of Classification Search ............. 455/552.1, 455/553.1, 554.2, 556.1, 560, 403, 422.1, 455/446, 449
See application file for complete search history.

(56) References Cited

U.S. PATENT DOCUMENTS

| | | | |
|---|---|---|---|
| 6,795,823 B1 | 9/2004 | Aklepi et al. | |
| 6,879,574 B2 * | 4/2005 | Naghian et al. | 370/338 |
| 2006/0109106 A1 | 5/2006 | Braun | |
| 2007/0087756 A1 * | 4/2007 | Hoffberg | 455/450 |
| 2007/0270164 A1 * | 11/2007 | Maier et al. | 455/456.2 |

* cited by examiner

*Primary Examiner*—Tony T Nguyen
(74) *Attorney, Agent, or Firm*—Shalom Wertsberger; Saltamar Innovations

(57) ABSTRACT

The invention enables a reliable end-to-end monitoring system by means of which the location of containers and other conditions related to the containers can be continuously or almost continuously monitored. The containers are equipped with such container units that are capable to co-operate with each other, which is especially needed in challenging radio environments. The co-operation of the container units is based on mesh network algorithms. Each container unit placed in a container includes a short range radio and a cellular network radio. Thus, the container unit is able to connect to two different types of communication networks. In addition, each container unit uses a certain connection set-up logic. When a set-up attempt results in a connection, the container transmits its message through the connection. The invention comprises the container unit, a mesh network composed of container units, and a system reporting container events.

30 Claims, 3 Drawing Sheets

CONTAINER UNIT, MESH NETWORK, AND SYSTEM REPORTING CONTAINER EVENTS

FIELD OF THE INVENTION

The invention relates generally to shipping and monitoring of containers.

BACKGROUND OF THE INVENTION

A container can be considered as a box made of steel. Instead of steel other strong enough materials could be also used. There are five common standard lengths for containers: 20 ft (6.1 m), 40 ft (12.2 m), 45 ft (13.7 m), 48 ft (14.6 m) and 53 ft (16.2 m). The container capacity is measured in twenty-foot equivalent units (TEU). A twenty-foot equivalent unit is a measure of containerized cargo capacity equal to one standard 20 ft (length)×8 ft (width)×8 ft 6 in (height) container. In metric units this is 6.10m (length)×2.44 m (width)×2.59 m (height). Thus, the capacity of one TEU is approximately 39 $m^3$. Most containers today are of the 40-ft and thus also known as 2 TEU.

"Containerization" is a term related to logistics that changed freight handling in the 20th century. A basic idea of the containerization is that a mode of transportation of cargo must be easily transformed into another.

For example, if a container is placed in a train, the container can be moved from the train to a ship and from the ship to a truck. The container is usually lifted up many times from the ground and moved to another place during its transportation. For example, forklifts, portainer cranes, and other types of devices move the container. These devices may also place the container in a pile of containers to wait the next step in the transportation. The above-mentioned length standards and other standards specified by ISO (international organization for standardization) simplify and speed up the handling of the container and the logistics related it.

Containerization is widely used in sea transport and in cargo shipping. Today, worldwide approximately 90% of non-bulk cargo is transported by containers. The containers are stacked on transport ships that can carry up to 9,000 TEU and even larger ships are intended to take in use in the future.

In the following we discuss about the prior art related to the invention.

U.S. Pat. No. 6,795,823 describes a system for tracking articles and optimally routing them. The system processes variable factors such as weather, traffic, and available trucks, and generates an optimal route for an article. The system includes global positioning sensors placed in the trucks. In addition to these sensors, the trucks are equipped with modems which send position coordinates obtained from the global positioning sensors via a pager network to the system. This way the system is able to track and route the trucks and the articles stacked in them.

The system of U.S. Pat. No. 6,795,823 operates in land but not at sea. In principle, a container can be continuously tracked in land and at sea when the container includes a satellite locator, satellite transceiver and a satellite antenna, and the position coordinates obtained from the satellite locator are sent through the satellite transceiver and antenna to a tracking system. Typically this requires a clear line of sight from the container to the satellite. In practice, the container may need to be located a number of times during its transportation in such a place that the satellite locator and/or the satellite transceiver and antenna is temporarily out of order due to lack of the line of sight to the satellite.

In a ship, in a harbor, or in other stock area the container may reside in the bottom layer of a huge pile of containers and for that reason it is not possible to connect to the container through its satellite antenna.

Furthermore, a great number of containers are loaded in a ship in cargo holds. The cargo holds are entirely isolated sections of the ship which are made of steel preventing all satellite connections to the containers.

One aspect related to connections is that satellite connections are expensive when comparing them to pager network connections or cellular network connections. This and other aspects are considered in U.S. patent application Ser. No. 10/994,781, published as US 2006/0109106 A1.

U.S. patent application Ser. No. 10/994,781 describes a monitoring system for a container. The system includes a central computer and an onboard device attached to the container. The onboard device includes a satellite modem and one or more sensors for sensing the conditions of the container. If a sensor of the onboard device alerts, the alert is sent through the satellite antenna to the central computer of the system. As an example, the sensor alerts, if someone breaks in into the container.

In one embodiment, the onboard device of U.S. patent application Ser. No. 10/994,781 further includes a short-range wireless communication module and/or a cellular telephone modem. Therefore the onboard device can alternatively send its alert via a short-range wireless network or via a cellular network to the central computer. In addition, the system may include fixed communication devices for creating communications hotspots.

A communication hotspot receives through its short-range wireless communication module an alert sent by the onboard device and transmits the alert to the central computer. The communication hotspot can be used in a ship, in a harbor, or in other area where containers are piled and the radio environment is very challenging.

The communication hotspot solves some of the problems related to the connections to the containers, but not all of them.

One drawback of the prior art is that container monitoring systems are too unreliable in a challenging radio environment. The communication hotspots work poorly when containers are stacked in a large group. In such group it is common that one or more containers cannot reliably communicate with the hotspot or with any network.

The use of different types of communication networks solves some of the problems related to the connections to the containers, but not all of them, because "a connection set-up logic" is missing.

Another drawback of the prior art is that the connection set-up logic for different types of communication networks is not properly specified.

SUMMARY OF THE INVENTION

One aspect of the invention is that it provides solutions to the above-mentioned drawbacks of the prior art.

Another aspect of the invention is that it enables the building of a reliable end-to-end monitoring system by means of which the location of containers and other conditions related to the containers can be continuously or almost continuously monitored.

Another aspect of the invention is that the containers to be monitored are equipped with such container units that are capable to co-operate with each other. The co-operation of the container units is especially needed in challenging radio environments.

Another aspect of the invention is that each container unit placed in a container to be monitored includes a short range radio and a cellular network radio. Thus, the container unit is able to connect to two different types of communication networks.

Another aspect of the invention is that a connection set-up logic is stored in the memory of the container unit. In order to send or transmit a message the container unit is adapted to perform on the basis of the connection set-up logic the following connection set-up attempts:

a connection through the short range radio system directly to a gateway unit providing a transmission path for the message, a connection through the short range radio system to the gateway unit via at least one other container unit which is placed in a different container, a connection through the cellular network radio to a cellular network providing an alternative transmission path for the message, and a connection through the short range radio system directly or via one ore more other container units to such container unit which is located on the service area of the cellular network.

Another aspect of the invention is that in addition to finding an available connection, the connection set-up logic may select the most appropriate connection, if there are at least two available connections. The selection of the connection may be based on the following criteria: the costs, the latency, the throughput, or the power consumption which are related to the use of a certain transmission path.

The invention comprises the above-mentioned container unit, a mesh network, and a system.

The mesh network is composed of container units placed in different containers, each of the container units being able to connect through its short range radio at least one other container unit of the mesh network.

The system reports events related to a plurality of container units. The system receives messages from the plurality of container units and makes the reports on the basis of the received messages.

BRIEF DESCRIPTION OF THE DRAWINGS

The invention is described more closely with reference to the accompanying drawings, in which.

DETAILED DESCRIPTION OF THE INVENTION

The container unit is intended for end-to-end monitoring. In other words the container unit is used to monitor one container from the site of a sender of the container to the site of the recipient of the container. The container unit is placed in the container to be monitored, which means that the container unit is permanently or temporarily attached to the container.

Figure 1:
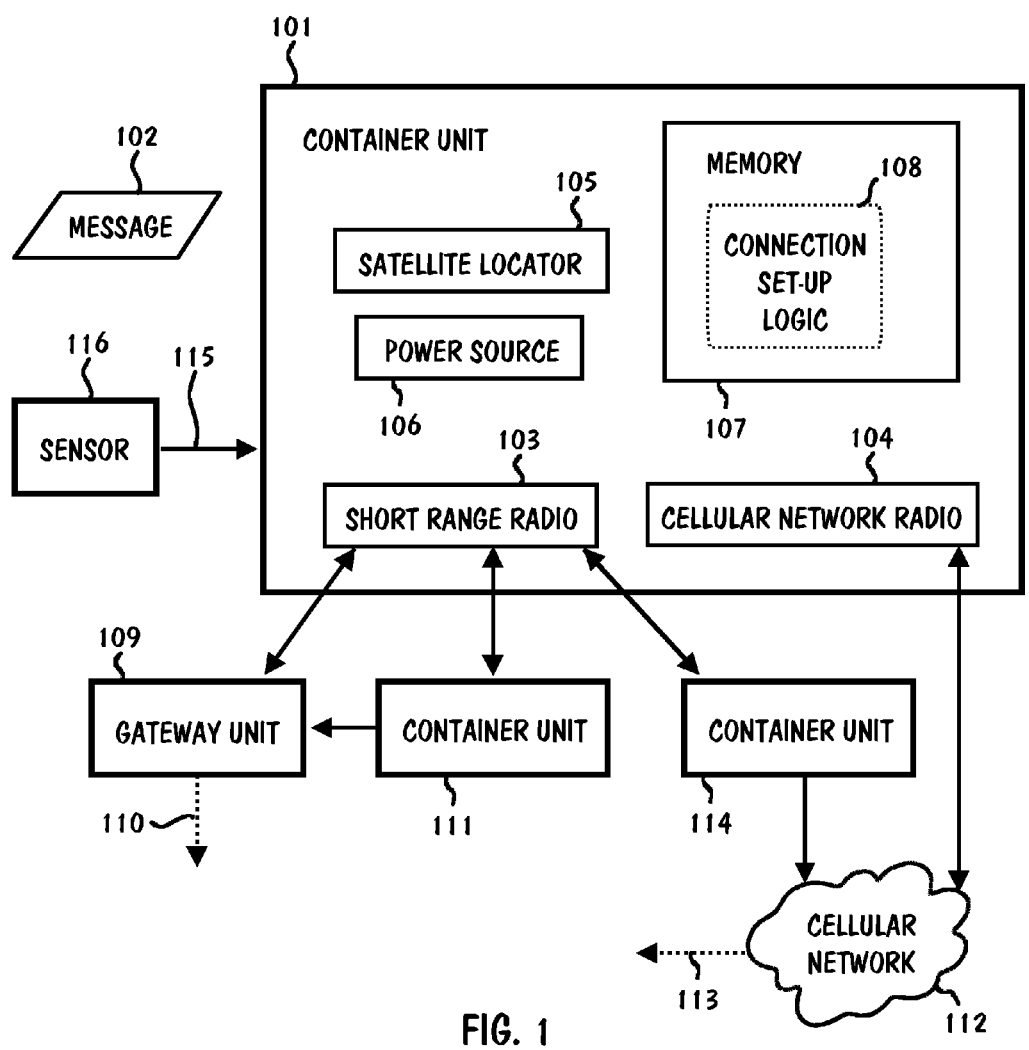
FIG. 1 shows a container unit in accordance with the invention.

FIG. 1 Shows a container unit in accordance with the invention. Generally speaking, the container unit 101 handles messages. Each of these messages is created as response to an event related to some container. Because container units can co-operate each other, a message handled by the container unit 101 is not necessarily originated from the same container in which the container unit 101 is placed. As an example, we may consider that the message includes the following data items: a container identifier, a location of the container, an event identifier, and a time of the event.

The container unit 101 is intended for handling a message 102 as response to an event. The container unit 101 is equipped with at least, a short range radio 103, a cellular network radio 104, a satellite locator 105, a power source 106, a memory 107, and a connection set-up logic 108 stored in the memory 107.

The container unit 101 is adapted to perform on the basis of the connection set-up logic 108 the following connection set-up attempts: a connection through the short range radio 103 directly to a gateway unit 109 providing a transmission path 110 for the message, b) a connection through the short range radio 103 to the gateway unit 109 via at least one other container unit 111 which is placed in a different container, c) a connection through the cellular network radio 104 to a cellular network 112 providing an alternative transmission path 113 for the message 102, and d) a connection through the short range radio 103 directly or via one ore more other container units to such container unit (111 or 114) which is located on the service area of the cellular network 112.

The container unit 101 can operate independently. In other words, when the above-mentioned connection set-up attempt c) succeeds, the container unit 101 sends the message 102 through its cellular network radio 104. On the other hand, the container unit is capable to operate as a node of a mesh network and it is capable to operate as a part of a system.

The connection set-up logic 108 may further define in which order the connection set-up attempts are performed. The best order is usually: a), b), c), and d). Gateway units such as the gateway unit 109 are arranged on the assumed transportation route of the containers. Therefore, if the container unit 101 is able to communicate with the gateway unit 109, it usually means that the container unit 101 should use the transmission path 110 provided by the gateway unit. Sometimes the transmission path 110 is the only available path and some other times the transmission path 110 is the cheapest of the available paths.

The connection set-up logic 108 may further define criteria for the order of the connection set-up attempts. These criteria concern the costs, the latency, the throughput, and/or the consumption of the power source 106 relating to the use of the transmission path 110 and/or the alternative transmission path 113. Thus, the criteria of the connection set-up logic may define that in certain circumstances the order of the connection set-up attempts differ from the order a), b), c), and d).

The container unit 101 is adapted to store the message 102 in the memory 107 at least till the point of time when one of the connection set-up attempts a)-d) is resulted in an available connection or when the message 102 expires. The expiration time of a message (such as message 102) is optional. If it is not set, the message does not expire. The expiration time related to the message may be message-specific. Alternatively, the expiration time may be mesh network-specific or system-specific.

The container unit 101 is further adapted to transmit the message 102 through the available connection.

The message 102 is originated from the container in which the container unit 101 is placed. Alternatively, the message 102 is originated some other container. As mentioned in the summary of the invention, the container units are capable to co-operate with each other. Therefore, it is possible that the container unit 101 has received the message 102 to be transmitted from the other container, or in more detail from the container unit placed in the other container.

In the following we discuss about the components 103-107 of the container unit 101.

The short range radio 103 comprises a TX/RX, because the container unit 101 must be able to receive and transmit messages. In more detail, the container unit must be able to operate as a node of a mesh network. The container unit uses known mesh network algorithms. According to one of these algorithms the container unit 101 negotiates with the other nodes of the mesh network to find a route for the message 102. This route may pass through a number of nodes.

The short range radio 103 complies with the first 802.11 standard specified by the IEEE, or some variant of the first 802.11 standard, such as 802.11b, or some technique intended for short range radio communications. The technique to be used may be standardized or non-standardized. The power consumption of a container unit causes sometimes problems during a long transportation. Therefore such techniques which save power are most suitable for the container unit 101.

The short range radio 103 preferably operates on an industrial, scientific and medical (ISM) band, because it is suitable for error-tolerant communications. ITU-R has currently defined the ISM bands in specifications 5.138 and 5.150. The ISM bands are: 868 MHz(Europe)/900(US) MHz band, 1.8 GHz band, 2.4 GHz band, and 5.8 GHz band. Also the above-mentioned 802.11b and 802.11g concern the use of 2.4 GHz ISM band.

The container unit 101 communicates through its short range radio 103 with the gateway unit 109 providing the transmission path 110. The transmission path 110 passes through one or more long range networks. The gateway unit 109 may be equipped with a long range radio. If the long range radio is a satellite modem, the transmission path 110 includes a satellite link.

If the container unit 101 cannot communicate through its short range radio with the gateway unit 109, it can usually use its cellular network radio 104. In other words, the container unit 101 uses the alternative transmission path 113 provided by the cellular network 112 for sending the message 102 or other messages.

The cellular network radio 104 operates in at least one of the following networks: a TDMA (time division multiple access), a GSM (global system for mobile communications) network, a CDMA (code division multiple access) network, a FDMA (frequency division multiple access) network, a UMTS (universal mobile telecommunications system) network.

The cellular network radio 104 may be a multi-frequency phone such as a GSM 900/GSM 1800/GSM 1900 phone. The GSM 900/GSM 1800/GSM 1900 phone is relatively cheap and it operates in the most of countries.

The satellite locator 105 is needed to obtain the geographical coordinates of the container in which the container unit 101 is placed.

The satellite locator 105 preferably operates in one of the following positioning systems: GPS (global positioning system), EGNOS (european geostationary navigation overlay service), Galileo, or GLONASS (globalnaja navigatsionnaja sputnikovaja sistema).

The power source 106 includes at least one of the following components: a battery, an accumulator, an aggregate or a charger which generates electricity, or a connection to an external electricity system.

The memory 107 stores the connection set-up logic 108. In addition, the memory stores, for example, the message 102 and other messages to be transmitted, and the mesh network algorithms.

The memory 107 includes at least one memory device. A memory device may be a disk memory, a ROM (read only memory), a RAM (random access memory) etc. If the memory includes many memory devices, they may be of the same kind or of different kinds.

Next we discuss about the content of the message 102 and handling of the message. The message 102 may include an event identifier and a time of the event. Here "event" refers to the event in response to which the message 102 was created, and "container" refers to the container in which the message 102 was created.

We may consider that a shipping company wants to know where its containers are located and whether the cargo stacked in the containers is in safe. As an example, the following events may put the cargo in danger:

a container is lost, i.e. the shipping company doesn't know where the container is located (the container is possibly left in a harbour thought it should be dispatched in a ship)

an unauthorized person has opened the container, the temperature inside the container is too low or two high.

The container unit 101 is adapted to receive signals 115 from at least one sensor sensing conditions in the container in which the container unit 101 is placed.

FIG. 1 shows a sensor 116 from which the signals 115 are sent though a wire or wirelessly to the container unit 101.

The sensor 116 may be a thermometer. Then the signals 115 disclose the temperature of the container and the event related to signals 115 is termed "measurement of temperature". The event identifier (event code) may disclose, for example, that the temperature inside the container is too high. The measured temperature in Celsius or in Fahrenheit is one example of the details related the event.

Alternatively, the sensor 116 is a door sensor. Then the signals 115 disclose that the door of the container has been opened.

A person skilled in the art knows that in addition to a thermometer and a door sensor there are other types sensors which may be attached to the container and from which the container unit 101 receives signals.

The data of the message 102 is related to a container from which the message is originated. This data includes at least some of the following data items: an identifier of the container from which the message is originated, the current location of the container, the event identifier, the details related to the event, and the time of the event.

The message 102 is preferably encrypted before transmitting. In addition, the message can be signed. These actions are performed for securing the communication between the sender (the container unit 101) and a recipient of the message 102. The recipient of the message is, for example, another container unit, the gateway unit 109, or a recipient system.

The encryption of the message 102 and/or the signature of the message are preferably based on a public key infrastructure (PKI). The encryption may compress the message, i.e. the encryption reduces the number of bits to be transmitted. This saves communication costs especially when using a satellite link in the transmission.

As mentioned in the above, when one of the connection set-up attempts a)-d) results in an available connection, the container unit 101 transmits the message 102 through the available connection. After that the container unit preferably removes the message from its memory 107.

Figure 2:
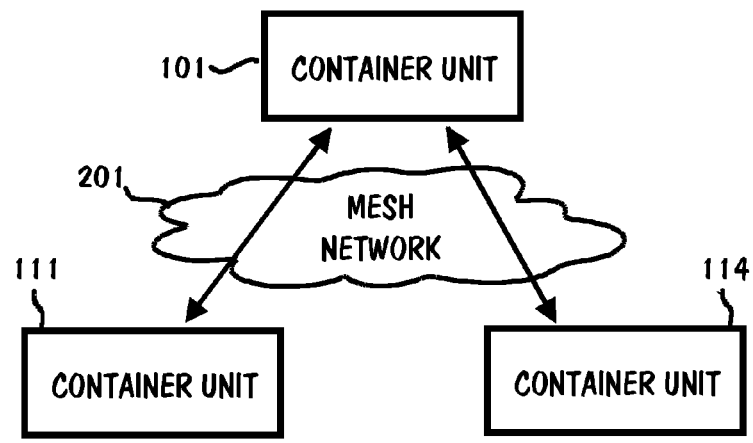
FIG. 2 shows a mesh network composed of container units.

FIG. 2 shows a mesh network composed of container units. The mesh network 201 is composed of container units placed in different containers. Each of these container units is similar to the container unit 101 and is able to connect through its short range radio to at least one other container unit of the mesh network.

The mesh network 201 comprises at least two nodes. If container units 111 and 114 are the same container unit, the mesh network 201 is composed of two nodes, i.e. the container unit 101 and the other container unit (111, 114). In that case the transmission path 110 as well as the alternative transmission path 113 are usable though the other container unit as shown in FIG. 1. The roles of the container unit 101 and the other container unit may be changed. In other words, the container unit 101 may provide the transmission path 110 and/or the alternative transmission path 113 for the other container unit (111, 114).

The container units move when containers move. Therefore the roles of the container units may change in the mesh network 201. It is also possible that the mesh network 201 enlarges, because a "new" container unit arrives on the service area of the mesh network and is therefore able to communicate through its short range radio with at least one node of the mesh network 201. Correspondingly, the mesh network 201 shrinks, if one of its nodes moves outside of the service area.

When considering the message 102 of FIG. 1, the message 102 may be from any node (i.e. any container unit) of the mesh network 201.

Figure 3:
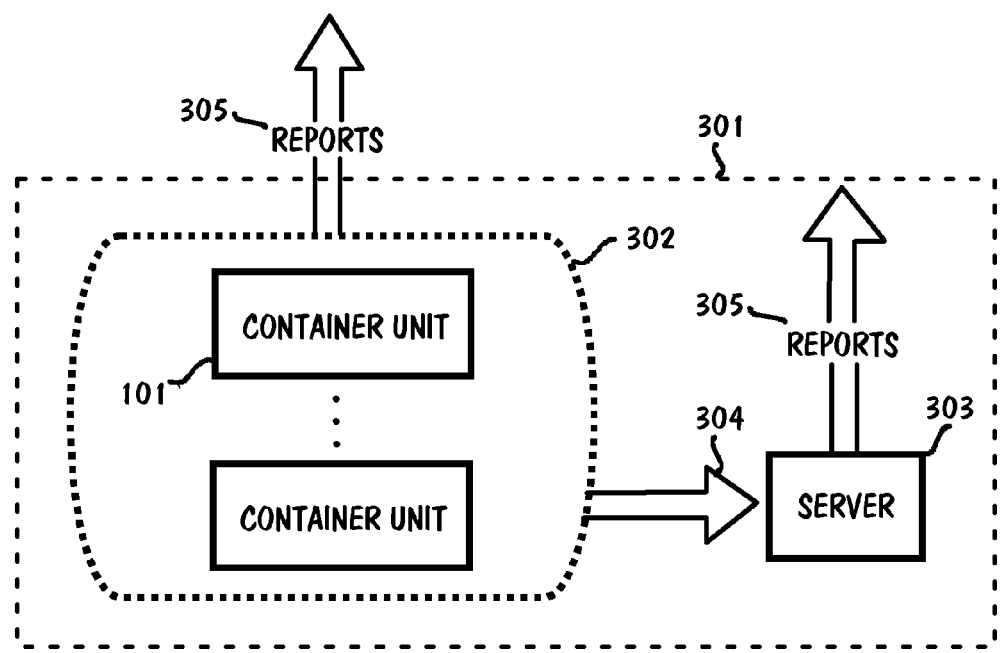
FIG. 3 shows a system for reporting events related to a plurality of container units.

FIG. 3 shows the system for reporting events related to a plurality of container units. As an example, the plurality of container units comprises the containers owned by a shipping company.

The shipping company probably wants to know where its containers are located and whether the cargo stacked in the container is in safe. In the above, we have mentioned some events putting the cargo in danger.

The system 301 comprises the plurality 302 of container units each of which is similar to the container unit 101. In other words, each container unit of the plurality 302 includes the components corresponding to the components 103-107 and each container unit of the plurality 302 uses the connection set-up logic 108. A container unit of the plurality 302 does not necessarily belong to any mesh network.

The plurality 302 of container units has the processing capacity and the memory capacity, thus they can operate independently and make reports, for example. However, in different operation environments certain additional components need to be added to the system 301. Therefore, the system 301 may further comprise a server 303.

The system 301 is adapted to receive messages 304 from the plurality 302 of container units.

The system 301 is further adapted to make the reports 305 on the basis of the received messages 304.

If the system 301 includes the server 303, the messages 304 are sent to the server 303. Then server 303 makes the reports 305. Alternatively, if the system does not include the server 303, the messages 304 are sent amongst the plurality 302 of container units to a certain container unit which makes the reports 305.

In FIG. 3 the plurality 302 includes the container unit 101, thus we may assume that the messages 304 include the message 102 transmitted by the container unit 101.

The system 301 usually sends the reports 305 to at least one recipient (a person) or a recipient system. As an example, we may assume that the system 301 sends its reports to a recipient system termed a "container monitoring system".

The system may further comprise a user interface through which the reports are readable.

The system may make the reports 305 in various ways. In the following we describe the ways to make the reports.

The system 301 makes one report per each received message. Then the system can be considered as a simple transmission system.

Alternatively, the system 301 makes one report on the basis of a number of received messages. Each container unit of the plurality 302 may be adapted to send each hour a message to the server 303 of the system. The sent message is not necessarily important. For example, if the message discloses a "normal" inside temperature related to the containers, the message is not necessarily important. The system determines on the basis of an intelligence placed in server 303 whether there is a need to write the data items included in the message in the report.

Before sending the reports 305 the system 301 may compress the reports and thus reduce the number of bits of to be sent.

In addition or alternatively, the system 301 may encrypt and/or sign the reports 305 before sending them. The system preferably uses the PKI in the encryption and the signature of the reports.

Figure 4:
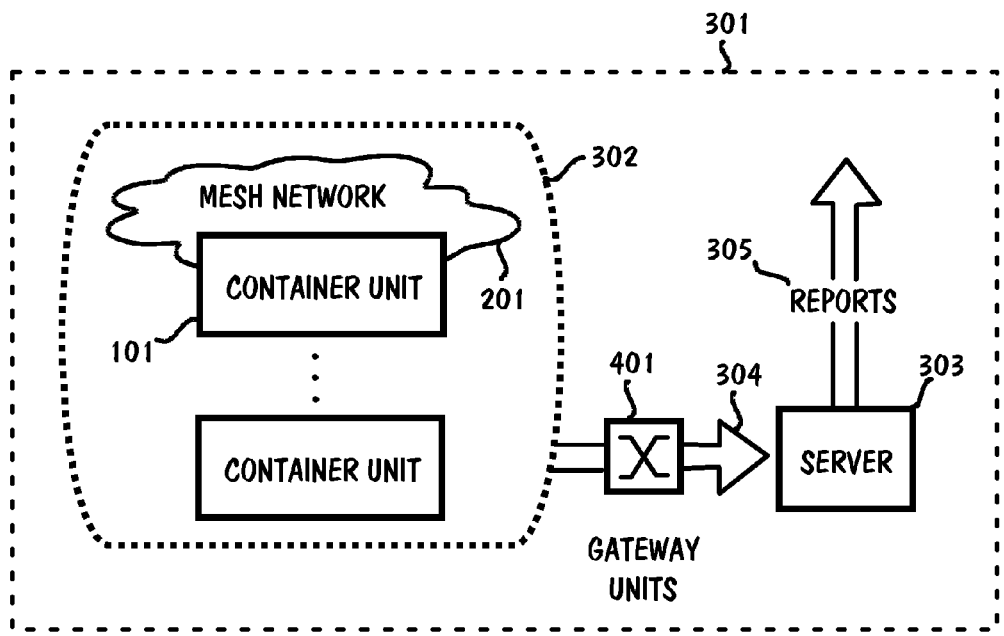
FIG. 4 shows one embodiment of the system.

FIG. 4 shows one embodiment of the system. In this embodiment the plurality 302 of container units includes at least one mesh network which is similar to the mesh network 201. FIG. 4 shows just one mesh network (201), but there could a number of mesh networks.

The system 301 further comprises communication means 401 by which the system is able to communicate with the mesh network 201. The communication means 401 comprises gateway units including the gateway unit 110.

These gateway units add their identifiers to the messages originated from the plurality 302 of container units. When the system 301 receives those messages it adds the identifiers of the gateway units and a system identifier to the reports 305 in order that a recipient of the reports is able to perform actions on the basis of the reports.

The above-mentioned actions are usually targeted to the containers which are disclosed in the reports. Then the system identifier, the gateway identifier(s), and the container identifier(s) are needed to route action instructions to the containers.

The embodiment of the system 301 shown in FIG. 4 can be implemented in various places, for example, in a container handling area, in a harbour, in a warehouse, or in a ship.

If the system 301 is implemented in a ship, the system comprises a satellite modem, because at sea a satellite connection is so far the only available connection.

Figure 5:
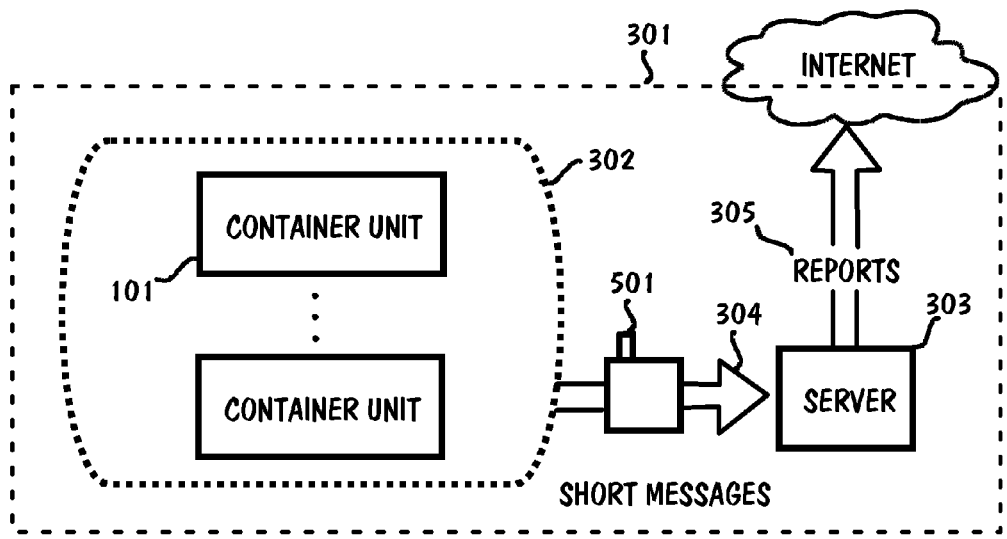
FIG. 5 shows another embodiment of the system.

FIG. 5 shows another embodiment of the system. 24. In this embodiment the messages 304 transmitted to the server 303 are short messages which the plurality 302 of container units has sent or transmitted through their cellular network radios. Thus, the system 301 comprises at least one TX/RX by which it receives the short messages. The TX/RX 501 may be a mobile phone.

The system 301 preferably comprises an Internet modem. Then the system can send the reports 305 with minimum costs via the Internet to a recipient system. The recipient system may locate in another country than the system 301. The system 301 is preferably implemented in each such country to which the containers are transported.

In addition to the descriptions and the examples shown above the container unit, the mesh network, and the system in accordance with the invention can be implemented in various ways which are, however, obvious to a person skilled in the art because of the person's professional ability and the ideas obtainable from this publication.

The lists mentioned in the above, such as the list of different cellular networks, are not exclusive lists.

The invention is defined in the following claims.

The invention claimed is:

1. A container unit for handling a message in response to an event, the container unit being placed in a container,
the container unit comprising:
a cellular network radio, a short range radio, a satellite locator, a power source, a memory, and a connection set-up logic stored in the memory;
the container unit being adapted to
store the message in the memory;
on the basis of the connection set-up logic, perform the following connection set-up attempts:
a) a connection through the short range radio system directly to a gateway unit providing a transmission path for the message,
b) a connection through the short range radio system to the gateway unit via at least one other container unit which is placed in a different container;
c) a connection through the cellular network radio to a cellular network providing an alternative transmission path for the message, and
d) a connection through the short range radio system directly or via one or more other container units to such container unit which is located on the service area of the cellular network;
and transmit the message when at least one of the connection set-up attempts results in an available connection or abandon the message when the message expires.

2. The container unit as in claim 1, wherein the connection set-up logic defines in which order the connection set-up attempts are performed.

3. The container unit as in claim 2, wherein the order is: a), b), c), and d).

4. The container unit as in claim 1, wherein the connection set-up logic defines criteria for the order, the criteria selected from a list consisting of costs, latency, throughput, energy consumption from the power source which are related to use of the transmission path use of the alternative transmission path, and any combination thereof.

5. The container unit as in claim 1, wherein the short range radio operates on at least one of the industrial, scientific and medical (ISM) bands.

6. The container unit as in claim 1, wherein the cellular network radio operates in at least one of the following networks: a TDMA (time division multiple access), a GSM (global system for mobile communications) network, a CDMA (code division multiple access) network, a FDMA (frequency division multiple access) network, a UMTS (universal mobile telecommunications system) network.

7. The container unit as in claim 1, wherein the satellite locator operates in one of the following positioning systems: GPS (global positioning system), EGNOS (european geostationary navigation overlay service), GLONASS (globalnaja navigatsionnaja sputnikovaja sistema), Galileo.

8. The container unit as in claim 1, wherein the transmission path includes a satellite link.

9. The container unit as in claim 1, wherein the container unit is adapted to receive signals from at least one sensor sensing conditions in the container in which the container unit is placed.

10. The container unit as in claim 1, wherein the message includes data related to a container from which the message is originated.

11. The container unit as in claim 7, wherein the data is composed of at least one of the following data items: an identifier of the container from which the message is originated, a current location of the container, an identifier of the event, details related to the event, and time of the event.

12. The container unit as in claim 1, wherein the message is encrypted before transmitting.

13. A mesh network composed of container units placed in different containers,
each container unit of the mesh network comprising a cellular network radio, a short range radio, a satellite locator, a power source, a memory, and a connection set-up logic stored in the memory,
and being adapted to
store the message in the memory and
on the basis of the connection set-up logic, perform the following connection set-up attempts:
a) a connection through the short range radio system directly to a gateway unit providing a transmission path for the message,
b) a connection through the short range radio system to the gateway unit via at least one other container unit of the mesh network;
c) a connection through the cellular network radio to a cellular network providing an alternative transmission path for the message, and
d) a connection through the short range radio system directly or via one or more container units of the mesh network to such container unit of the mesh network which is located on the service area of the cellular network;
and transmit the message when at least one of the connection set-up attempts results in an available connection or abandon the message when the message expires.

14. The mesh network as in claim 13, wherein the message of claim 1 is from any container unit of the mesh network.

15. A system for reporting events related to a plurality of container units,
each container unit comprising: a cellular network radio, a short range radio, a satellite locator, a power source, a memory, and a connection set-up logic stored in the memory,
the container unit being adapted to
store the message in the memory;
on the basis of the connection set-up logic, perform the following connection set-up attempts:
e) a connection through the short range radio system directly to a gateway unit providing a transmission path for the message,
f) a connection through the short range radio system to the gateway unit via at least one other container unit which is placed in a different container;
g) a connection through the cellular network radio to a cellular network providing an alternative transmission path for the message, and
h) a connection through the short range radio system directly or via one or more other container units to such container unit which is located on the service area of the cellular network;
and transmit the message when at least one of the connection set-up attempts results in an available connection or abandon the message when the message expires;
the system being adapted to
receive messages from the plurality of container units, and produce reports on the basis of the received messages.

16. The system as in claim 15, wherein the system further comprises a server.

17. The system as in claim 15, wherein the system further comprises a user interface through which the reports are readable.

18. The system as in claim 15, wherein the system makes one report per each received message.

19. The system as in claim 15, wherein the system makes one report on the basis of a number of received message.

20. The system as in claim 15, wherein before sending the reports the system compresses the reports reducing the number of bits of to be sent.

21. The system as in claim 15, wherein the reports are encrypted before sending.

22. The system as in claim 15, wherein the plurality of container units includes at least one mesh network.

23. The system as in claim 22, wherein the system further comprises communication means by which the system is able to communicate with the at least one mesh network.

24. The system as in claim 23, wherein the communication means comprises gateway units.

25. The system as in claim 24, wherein the gateway units adds their identifiers to the messages originated from the plurality of container units.

26. The system as in claim 25, wherein the system adds the identifiers of the gateway units and a system identifier to the reports in order to enable a recipient of the reports to perform actions on the basis of the reports.

27. The system as in claim 22, wherein the system is implemented in one of the following places: a container handling area, a harbour, a warehouse, a ship.

28. The system as in claim 22, wherein the system further comprises a satellite modem.

29. The system as in claim 15, wherein the received messages are short messages which the plurality of container units has sent through their cellular network radios.

30. The system as in claim 15, wherein the system further comprises an Internet modem.

* * * * *